United States Patent
Sukhman et al.

[11] Patent Number: 5,901,167
[45] Date of Patent: May 4, 1999

[54] AIR COOLED GAS LASER

[75] Inventors: Yefim P. Sukhman, Scottsdale; Christian Julian Risser; Mikhail E. Ryskin, both of Phoenix, all of Ariz.

[73] Assignee: Universal Laser Systems, Inc., Scottsdale, Ariz.

[21] Appl. No.: 08/846,552

[22] Filed: Apr. 30, 1997

[51] Int. Cl.$^6$ ............................................... H01S 3/22
[52] U.S. Cl. ............................ 372/58; 372/34; 372/36; 372/55; 372/61; 372/65
[58] Field of Search .............................. 372/55, 58, 61, 372/63, 65, 34, 36

[56] References Cited

U.S. PATENT DOCUMENTS

| | | | |
|---|---|---|---|
| 3,593,189 | 7/1971 | Buhrer | 372/32 X |
| 3,763,442 | 10/1973 | McMahan | 372/34 X |
| 4,169,251 | 9/1979 | Laakmann | 372/34 X |
| 4,342,113 | 7/1982 | Iwata | 372/33 |
| 4,363,126 | 12/1982 | Chenausky | 372/38 |
| 4,373,202 | 2/1983 | Laakmann | 372/64 |
| 4,383,203 | 5/1983 | Stanley | 315/248 |
| 4,429,398 | 1/1984 | Chenausky | 372/64 |
| 4,443,877 | 4/1984 | Chenausky | 372/38 |
| 4,451,766 | 5/1984 | Angle | 315/248 |
| 4,455,658 | 6/1984 | Sutter | 372/38 |
| 4,493,087 | 1/1985 | Laakmann | 372/64 |
| 4,573,159 | 2/1986 | Aagano et al. | 372/34 |
| 4,589,114 | 5/1986 | Sutter, Jr. | 372/19 |
| 4,596,018 | 6/1986 | Gruber | 372/87 |
| 4,612,648 | 9/1986 | Peterson et al. | 372/109 |
| 4,613,972 | 9/1986 | Bettman | 372/107 |
| 4,631,449 | 12/1986 | Peters | 315/205 |
| 4,672,620 | 6/1987 | Slusher | 372/58 |
| 4,675,874 | 6/1987 | Pohler | 372/33 |
| 4,679,202 | 7/1987 | Maloney | 372/65 |
| 4,688,228 | 8/1987 | Newman | 372/18 |
| 4,703,491 | 10/1987 | Lim | 372/93 |
| 4,719,639 | 1/1988 | Tulip | 372/66 |
| 4,748,634 | 5/1988 | Hesterman | 372/82 |
| 4,779,284 | 10/1988 | Nissen | 372/59 |
| 4,787,090 | 11/1988 | Newman | 372/82 |
| 4,791,637 | 12/1988 | Kimura | 372/58 |
| 4,805,182 | 2/1989 | Laakmann | 372/82 |

(List continued on next page.)

OTHER PUBLICATIONS

Team Company, Inc. Cold Welding Information. Pinch–Off Systems, Precision Tools for Cold Welding. Aug. 1993.

Laakmann, Peter, "The Market Continues to Grow for Sealed Carbon Dioxide Lasers". *Industrial Laser Review*. Oct., 1993. pp. 9–12.

Morley, R.J., "Mode and Frequency Control of Compact $CO_2$ Slab Lasers Through Intra–Cavity Coherent Imaging". *Applied Optics*. vol. 34, No. 3, Jan. 20, 1995. pps.

*Primary Examiner*—Brian Healy
*Attorney, Agent, or Firm*—Donald J. Lisa

[57] ABSTRACT

A gas laser design (10) includes, an elongated sealed tube (21) filled with a gas, a power supply for exciting the gas, an optical resonator (24,25) for producing directional optical energy, and a fan/electronics package assembly (50), all of which are surrounded and enclosed by an external housing (30,70,90) forming a passageway in the space between the tube and the housing for providing cooling air therethrough. The passageway is divided into two physically separated cooling air paths by a horizontal surface (21a or 41). The lower space is a dual L-shaped path defining the first cooling air path downwardly at the inlet end of the tube in the vertical air channels (31,32) formed by the contoured shape of the tube and rearwardly (33) through the spaces (27,29) between the horizontal fins (26,28) of the tube to an outlet (101) at the rear of the tube. The upper space defines the second cooling air path from the inlet end of the tube horizontally rearwardly (64) around and over the electronics package (50) mounted in that portion of the passageway in a U-shaped finned heatsink channel (53), through the spaces (61,63) between the fins (62,64) to the atmosphere at the rear end. The zone (44) under the fan (52) is common to both cooling air paths. All components related to air cooling are enclosed within the outer housing forming a compact, high power, thermally stable, gas laser assembly.

23 Claims, 4 Drawing Sheets

U.S. PATENT DOCUMENTS

| | | | |
|---|---|---|---|
| 4,809,284 | 2/1989 | Chenausky | 333/24 R |
| 4,833,681 | 5/1989 | Akiyama | 372/32 |
| 4,837,772 | 6/1989 | Laakmann | 372/82 |
| 4,847,852 | 7/1989 | Yatsiv | 372/82 |
| 4,852,109 | 7/1989 | Kuchar | 372/34 |
| 4,856,010 | 8/1989 | Wissman | 372/32 |
| 4,875,218 | 10/1989 | Hongo | 372/64 |
| 4,891,819 | 1/1990 | Sutter, Jr. | 372/82 |
| 4,893,353 | 1/1990 | Iwaoka | 455/612 |
| 4,908,585 | 3/1990 | Chenausky | 333/24 R |
| 4,912,526 | 3/1990 | Iwaoka | 372/32 X |
| 4,928,756 | 5/1990 | Shull | 372/34 |
| 4,930,136 | 5/1990 | Chaffee | 372/62 |
| 4,953,172 | 8/1990 | Gurski | 372/62 |
| 4,953,176 | 8/1990 | Ekstrand | 372/107 |
| 4,969,153 | 11/1990 | Levshon | 372/65 |
| 5,008,894 | 4/1991 | Laakmann | 372/38 |
| 5,014,282 | 5/1991 | Herziger et al. | 372/93 |
| 5,048,032 | 9/1991 | Ekstrand | 372/34 |
| 5,050,184 | 9/1991 | Nelson | 372/107 |
| 5,065,405 | 11/1991 | Laakmann | 372/92 |
| 5,113,407 | 5/1992 | Kobayashi | 372/61 |
| 5,123,028 | 6/1992 | Hobart | 372/95 |
| 5,131,003 | 7/1992 | Mefferd | 372/65 |
| 5,135,604 | 8/1992 | Kumar | 156/626 |
| 5,150,372 | 9/1992 | Nourrcier | 372/38 |
| 5,151,916 | 9/1992 | Iehisa et al. | 372/61 |
| 5,172,388 | 12/1992 | Long | 372/70 |
| 5,216,689 | 6/1993 | Gardner | 372/87 |
| 5,224,117 | 6/1993 | Kruger | 372/82 |
| 5,251,223 | 10/1993 | Hiroshima | 372/34 |
| 5,253,261 | 10/1993 | Chaffee | 372/34 |
| 5,260,964 | 11/1993 | Morin | 372/95 |
| 5,311,529 | 5/1994 | Hug | 372/35 |
| 5,315,605 | 5/1994 | Nakazawa | 372/34 |
| 5,335,242 | 8/1994 | Hobart | 372/95 |
| 5,353,293 | 10/1994 | Shull | 165/182 |
| 5,353,297 | 10/1994 | Koop | 372/64 |
| 5,412,681 | 5/1995 | Eisel | 372/64 |
| 5,461,636 | 10/1995 | Karube et al. | 372/58 |
| 5,475,703 | 12/1995 | Scalise | 372/82 |
| 5,479,428 | 12/1995 | Kuzumoto | 372/61 |
| 5,549,795 | 8/1996 | Gregoire | 204/164 |
| 5,586,134 | 12/1996 | Das | 372/38 |
| 5,592,504 | 1/1997 | Cameron | 372/61 |
| 5,661,746 | 8/1997 | Sukhman | 372/83 |
| 5,771,258 | 6/1998 | Morton et al. | 372/57 |

AIR COOLED GAS LASER

BACKGROUND OF THE INVENTION

1. Fields of the Invention

The present invention relates generally to an apparatus and method for air cooling a gas laser tube, especially of the waveguide, free-space, and, more recently free-space gas slab laser varieties, and, more particularly, to a forced air system in which an air passageway between the outside of an extruded, elongated, contoured and finned gas laser tube and the inside of a housing enclosing the tube is divided into two, separate cooling air paths, the first path being an L-shaped path for cooling the finned tube, and the second path being for cooling an electronics package mounted in a U-shaped heatsink channel in the second path, and, which is efficiently arranged in a small, compact package.

2. Discussion of Background and Prior Art a. Controlled Thermal Environment

Due to the intense heat generated within gas laser tubes, and the continuing development of new and better gas lasers, maintaining a controlled thermal environment for the gas laser tube continues as a major problem for laser manufacturers despite many solutions for various aspects of the problem over the years.

(1) Balanced Cooling

One aspect of the problem of maintaining a controlled thermal environment in a gas laser is to provide a cooling system which efficiently and effectively dissipates the heat. In such systems, it is also important to remove the heat in a balanced manner proportionally to the rate at which it is developed in various locations around the tube in order to maintain a uniform thermal environment. This need is especially important in elongated gas lasers where preventing bending moments from uneven heating and cooling is critical in maintaining predetermined electrode spacing in the discharge area for efficient lasing, predetermined electrode-to-housing spacing for meeting designed capacitance parameters and impedance matching characteristics, and torsion free longitudinal expansion of the electrodes within the tube resonator alignment. Accordingly, it is an object of the present invention to provide an elongated but compact gas laser in a small package to meet the above criteria.

(2) Simultaneously Cooling the Tube Itself and Associated Electrical Components

Of primary concern is to cool the gas laser tube itself since the laser plasma formed inside the tube in the discharge area is the primary source of heat emanating from the tube. However, additional heat is also supplied by associated electrical or electronic components and that heat must also be dissipated uniformly and proportionately.

In an air cooled system by Chaffee in U.S. Pat. No. 5,253,261 a cooling air flow is provided in an annular space between a cylindrical gas laser tube and an outer cylindrical housing by a pair of centrally located suction fans creating a cooling air flow through a solenoid and out of the housing. The air is drawn into the tube in opposite directions through air channels between the tube and electrical solenoid assemblies surrounding the tube and exits centrally of the solenoids through the suction fans, the air in each channel simultaneously cooling the tube and the electrical solenoids surrounding the tube. However, Chaffee does not disclose, and it is an object of the present invention to provide, a cooling air system for gas lasers having parallel, spaced-apart, elongated electrodes with a cooling air path which is divided into two separated paths, one for cooling a contoured, finned tube, and the other for cooling a finned heatsink electronics package.

In a system to Hiroshima in U.S. Pat. No. 5,251,223 an air cooled argon ion laser tube is disclosed in which air from a fan mounted on the outside of a cover surrounding the tube and over radial fins to cool the tube located in the same chamber adjacent a hot cathode bulb. A problem with Hiroshima is it does not uniformly dissipate heat in a balanced manner. Accordingly, like Chaffee, Hiroshima does not disclose, and it is an object of the present invention to provide, a cooling air system for an elongated gas laser of the waveguide, free-space or free-space slab varieties wherein the fan is mounted inside of the outer cover driving air through two separated, divided paths to simultaneously cool the tube and an associated electronics package while dissipating heat from both areas in a uniform, balanced manner.

Finally, in an approach by Das in U.S. Pat. No. 5,586,134 the electronics components generating voltage pulses applied to the cathode of an excimer laser are air cooled (FIG. 10) by a forced air system in which the cool air flows past a thyratron and around a chimney and trigger board, all in the space between the laser housing and an outer cover, and the heat is removed from the cooling air in an external water cooled heat exchanger. However, Das's system for cooling the tube itself uses a flow path of the laser gas cooled separately by a water cooled heat exchanger inside the tube. Accordingly, it is an object of the present invention to simultaneously air cool the laser tube and the electronics package by providing divided paths totally within the passageway between the tube and the outer cover in a small, compact package.

Further objects and advantages will be apparent from the summary and detailed description of the present invention which follows.

SUMMARY OF THE INVENTION

Set forth below is a brief summary of the invention in order to achieve the foregoing and other benefits and advantages in accordance with the purposes of the present invention as embodied and broadly described herein.

One aspect of the invention is a compact air cooled laser including a sealed tube filled with a laser gas constructed and configured for coupling to an external electronics package, an optical resonator aligned with the discharge area for producing directional optical energy in the discharge area and emanating therefrom, an outer housing enclosing the tube and defining a passageway therebetween for the passage of cooling air therethrough, an electronics package supported in a heatsink in the passageway including the power supply for exciting the laser gas, a fan supported in communication with the passageway for providing cooling air thereto, the tube having a finned external shape, and the passageway being divided into at least two separated cooling air paths, the first cooling air path for cooling the tube, and the second cooling air path for cooling the electronics package.

A feature of this aspect of the invention is wherein the fan is mounted inside the outer housing in an air inlet end of the passageway atop one end of the tube and the passageway has an air outlet end at the other end of the tube.

A feature of this aspect of the invention is wherein the tube is an extruded, externally contoured structure.

Another feature of this aspect of the invention is wherein the contoured shape of the tube includes a rectangular cross-section structure having a uniform length and height and a wide portion having a plurality of spaced-apart fins extending horizontally from the structure along a first portion of the length and a narrow portion having a plurality of spaced-apart fins extending horizontally from the structure adjacent the wide fins along a second portion of the length.

A further feature of this aspect of the invention is the tube having a wide portion and a narrow portion, a planar surface separating the two paths along the entire length of that portion of the tube having the wide portion wherein the space below the planar surface is the first cooling path and the space above the planar surface is the second cooling path.

A still further feature of this aspect of the invention is a zone immediately below the fan which is common to both paths.

A still further feature of this aspect of the invention is wherein the first cooling air path is a dual L-shaped path which includes a pair of vertical air channels one on each side of a reduced width portion of the tube between said portion and adjacent housing portions, and a plurality of horizontal spaces between pairs of adjacent fin portions of the wide portion of the tube and pairs of adjacent fin portions of the narrow portion of the tube forming a plurality of continuous horizontal air channels communicating with the vertical air channels, whereby cooling air is forced by the fan from the air inlet end of the passageway at one end of the tube downwardly through the vertical channels and across through the horizontal channels of the first cooling air path and out the air outlet end of the passageway at the other end of the tube.

A further feature of this aspect of the invention includes the electronics package supported in the second cooling air path in a U-shaped, finned heatsink, the spaces between adjacent pairs of fins forming a plurality of continuous, lengthwise, air channels in the second cooling air path, whereby cooling air is forced by the fan from an air inlet end of the passageway at one end of the tube across through the lengthwise air channels of the second cooling air path and out an air outlet end of the passageway at the other end of the tube.

A further feature of this aspect of the invention is wherein the physical size and heat dissipating capacity of each path is predetermined such that the total volume of air flow in the passageway is divided between the two paths proportionately to the quantum of heat that must be dissipated in each path to maintain a uniform operating temperature throughout the laser.

A further aspect of the invention is the methods performed by the apparatuses described above and in the detailed description which follows.

The benefits of the present invention are:

1. A specially contoured, finned design enables simultaneous forced air cooling of the gas laser tube and the associated electronics package in two separate cooling air paths.

2. Continuous longitudinal forced air flow of cooling air in one direction in one end of the outer housing and out the other end of the outer housing provides uniform and efficient overall cooling of all components.

3. Heat generated by the laser and the associated electronics package is dissipated in each path in a balanced manner at a rate proportional to that at which it is generated in each path.

4. A controlled thermal environment is maintained around the entire gas laser.

5. Air cooling components are totally maintained inside of the passageway between the gas laser tube and the outer housing providing a compact, lightweight, high power, thermally stable product.

6. Simple, efficient, extruded design enables use of a single fan and reduced manufacturing costs in a compact structure.

Figure 1:
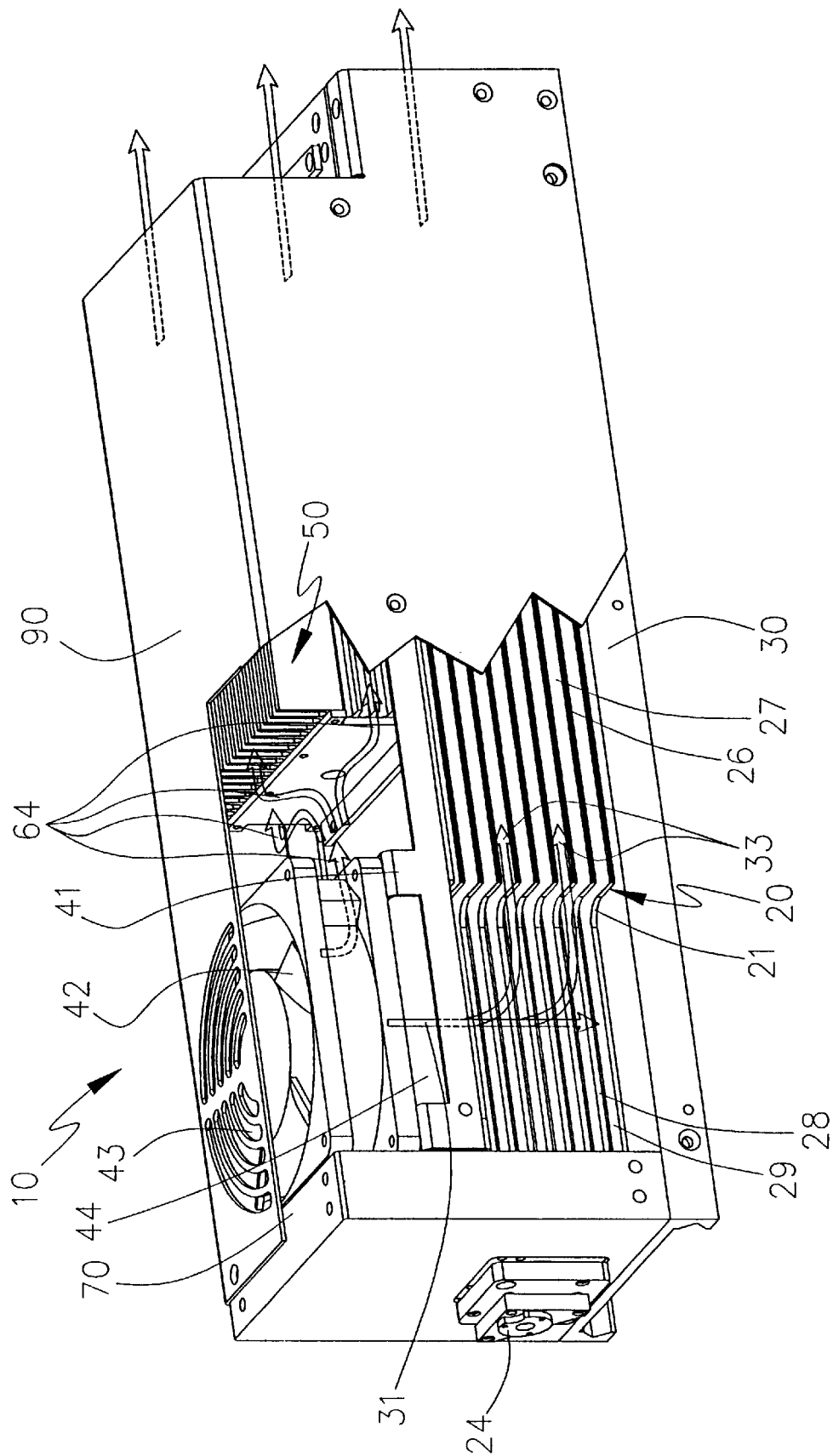
FIG. 1 is a perspective view of the air cooled gas laser assembly of the present invention showing the divided cooling air path of the present invention wherein a first cooling air path extends from an inlet end at the fan vertically downward through the vertical channels formed between the contoured tube assembly and the outer housing and across through the horizontal spaces between the horizontal fins of the tube and, a second cooling air path extends horizontally between the housing and the tube from the fan over and around the electronics package through the horizontal and vertical spaces between the fins of the U-shaped heatsink channel and out the rear end of the laser assembly.

DETAILED DESCRIPTION OF THE PREFERRED EMBODIMENT a. Air Cooled Gas Laser Assembly Air cooled laser assembly 10 as best seen in FIG. 1 shows a laser tube assembly 20 secured to a machined aluminum tube base 30 at its bottom end and supporting above its top surface 21*a* (FIG. 2) an electronics/fan assembly 40 (best seen in FIG. 2) surrounded by a sheet metal front cover 70 closing the front end of the gas laser assembly 10 and having a mirror window 71 therein through which the laser beam exits during laser operations.

Sheet metal main cover or housing 90 is secured to tube base 30 to close the sides and top portion of gas laser assembly 10 and has therein perforations forming an air inlet 43 for the fan. The rear end of gas laser assembly 10 is closed by rear mirror cover 100 which provides a plurality of slots 101 forming an air outlet for the first cooling air path as described in greater detail below. Similarly, the rear end of the spaces 61,63 between the horizontal side fins and vertical top fins of the electronics package assembly 50 form a rear air outlet end for the second cooling air path as described in greater detail below.

The outer housing structure, primarily tube base 30, front mirror cover 70 and main cover 90 enclose the tube assembly 20 and the electronics/fan assembly 40 to define therebetween a passageway for the passage of cooling air therethrough.

Supported in that passageway is the electronic/fan assembly 40 which includes the electronics package assembly 50 supported in finned heatsinks which include the RF supply which is coupled to the electrodes. In the preferred embodiment, of course, both RF feeds 22 couple to corresponding terminals on circuit board 54.

As described in greater detail below, fan 42 is supported in communication with the passageway described above for providing cooling air. As best seen in FIG. 1 the passageway is divided into two separated cooling air paths. The first cooling air path shown by arrows 31,33 is downward through the vertical channel 31 formed by the profiled tube 21 and the top cover 90 and horizontally rearward through the horizontal paths 33 for cooling the tube. The second cooling path shown by arrow 64 is rearwardly over and around electronics package assembly 50 for cooling the heatsink. These paths are each described in greater detail below.

b. Laser Tube Assembly and the First Cooling Air Path

Figure 2:
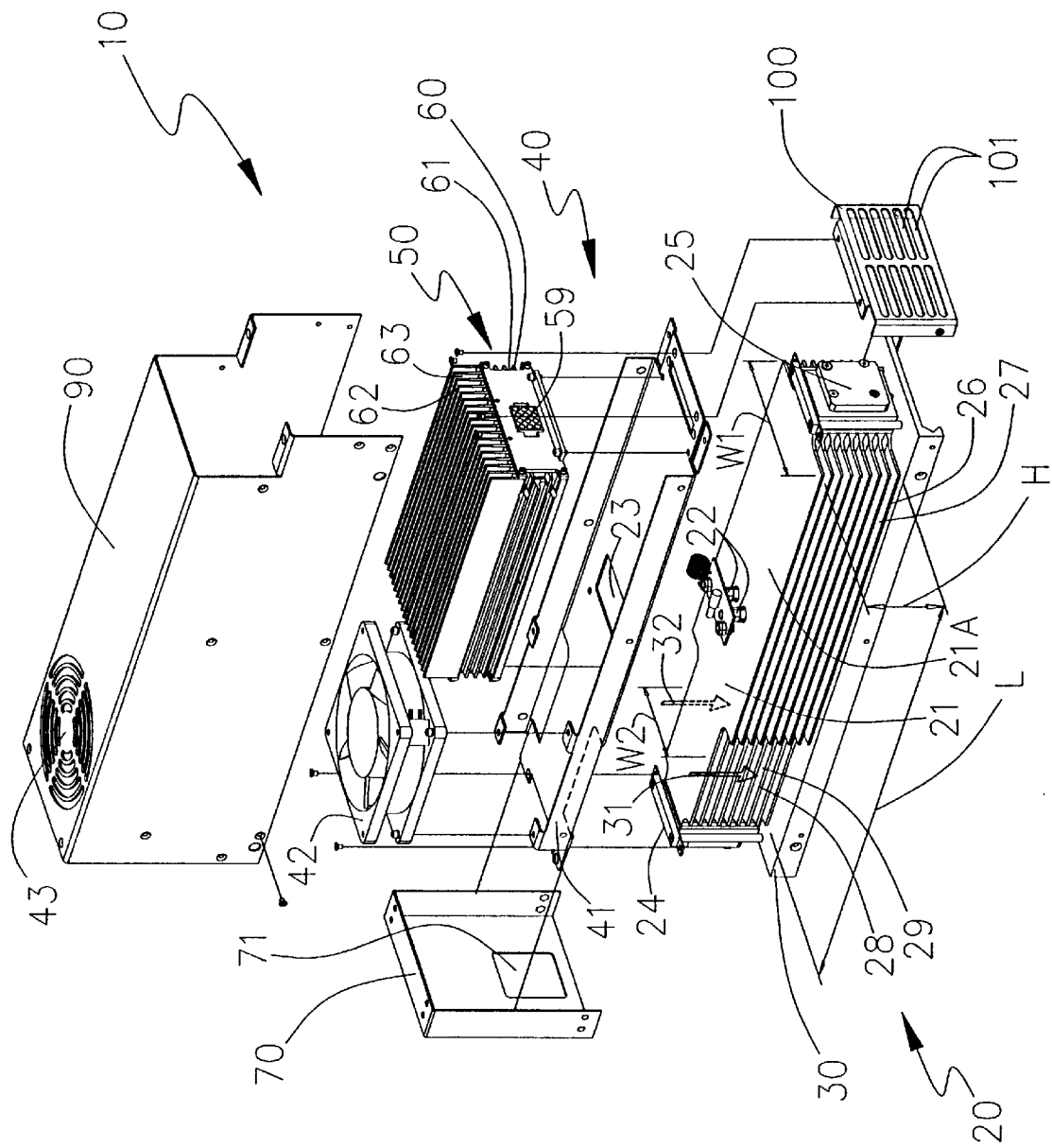
FIG. 2 is an exploded perspective view of the air cooled gas laser assembly of FIG. 1 showing the laser tube assembly, the tube base, the electronics fan assembly, the front cover, the front and rear mirror covers, and the main housing cover.

Shown in FIG. 1 is the gas laser assembly 10. Gas laser assembly 10 includes a laser tube assembly 20 which includes a sealed tube 21 filled with a laser gas in which is housed a pair of parallel spaced-apart, elongated electrodes (not shown) forming a discharge area with at least one of the electrodes being constructed and configured for a coupling to an external RF supply for RF exciting the laser gas. For this purpose, RF feeds 22 (FIG. 2) are coupled to the electrodes at one end and, at the other end seen in FIG. 2, are adapted to couple to electrical connections on the underside of circuit board 54 (FIG. 3) through window 23 in electronics/fan assembly 40 base plate 41. Air cooled gas laser assembly 10 further includes an optical resonator which includes front and rear mounted mirror/end cap assemblies 24,25 which seal off the respective ends of tube 21 and form an optical resonator aligned with the discharge area for producing directional optical energy in the discharge area and emanating therefrom in a typical laser beam through front cover mirror window 71 as is well known to those of ordinary skill in the art.

As best seen in FIG. 2 tube 21 is an extruded tube and has basically a rectangular cross-section structure which has a uniform length L and height H. The width of tube 21, however, has two dimensions. First, there is a wide portion of width W1 formed by a plurality of spaced-apart fins extending horizontally from the structure along a first portion of the length of the tube 21 contiguous to which is a narrow portion of width W2 formed by a plurality of spaced-apart fins 28 extending horizontally from the structure along a second portion of the length of the tube 21. This profiled or contoured shape is an essential part of the formation of the first cooling air paths as described in greater detail below. The narrowed width portion W2 of the tube 21 surrounded by the adjacent portions of the housing 90 the forward end of which is closed by front mirror cover 70 forms a pair of vertical air channels 31,32 (FIG. 2) therebetween. Additionally, the spaces 27,29 between pairs of adjacent finned portions 26 of the wide portion of the tube and pairs of adjacent fin portions 28 of the narrow portion of the tube form a plurality of continuous horizontal air channels generally shown by arrows 33 (FIG. 1) communicating with the vertical air channels 31,32 such that cooling air is forced by the fan 42 from the air inlet 43 of the passageway at one end of tube 21 downwardly through the vertical channels 31,32 and across through the horizontal channels 33 of the first cooling air path and out the air outlet slots 101 at the other end of the tube 21. The first cooling air path described above is essentially a dual L-shaped path which is totally separate from a second cooling air path to be described below, except for a common zone 44 immediately below fan 42 at the inlet end 43 of the gas laser assembly 10. As best seen in FIG. 2, a planar surface, such as, the flat surface portion of base plate 41, or, in an alternative design not shown, the top surface 21a of the tube 21 throughout the wide portion of its length, divides the two air paths into two separated paths, the lower half of the gas laser assembly below the flat surfaces 21a,41 being the first cooling air path described above for cooling the tube, while the upper half of the gas laser assembly 10 above the surfaces 21a,41 being the second cooling air path to be described below for cooling the electronics package assembly 70.

c. Electronics/Fan Assembly and the Second Cooling Air Path

The electronics/fan assembly 40 includes base plate 41 to which is secured fan 42 at inlet end 43 of laser tube assembly 10. The space atop planar surface of base plate 41 immediately below fan 42 is common to both the first and second cooling air paths. When the fan operates, it builds a pressure in the space defined above the top surface of base plate 41 as well as directing air downwardly through vertical channels 31 and 32. The latter air flow through the vertical channels 31, 32 as described above, turns rearwardly to proceed through air horizontal channels 33. However, the build up of pressure by fan 42 in the space defined above the top surface of base plate 41 causes that portion of the air flow to divide and move rearwardly above the top surface of base plate 41 toward electronics package assembly 50.

Figure 3:
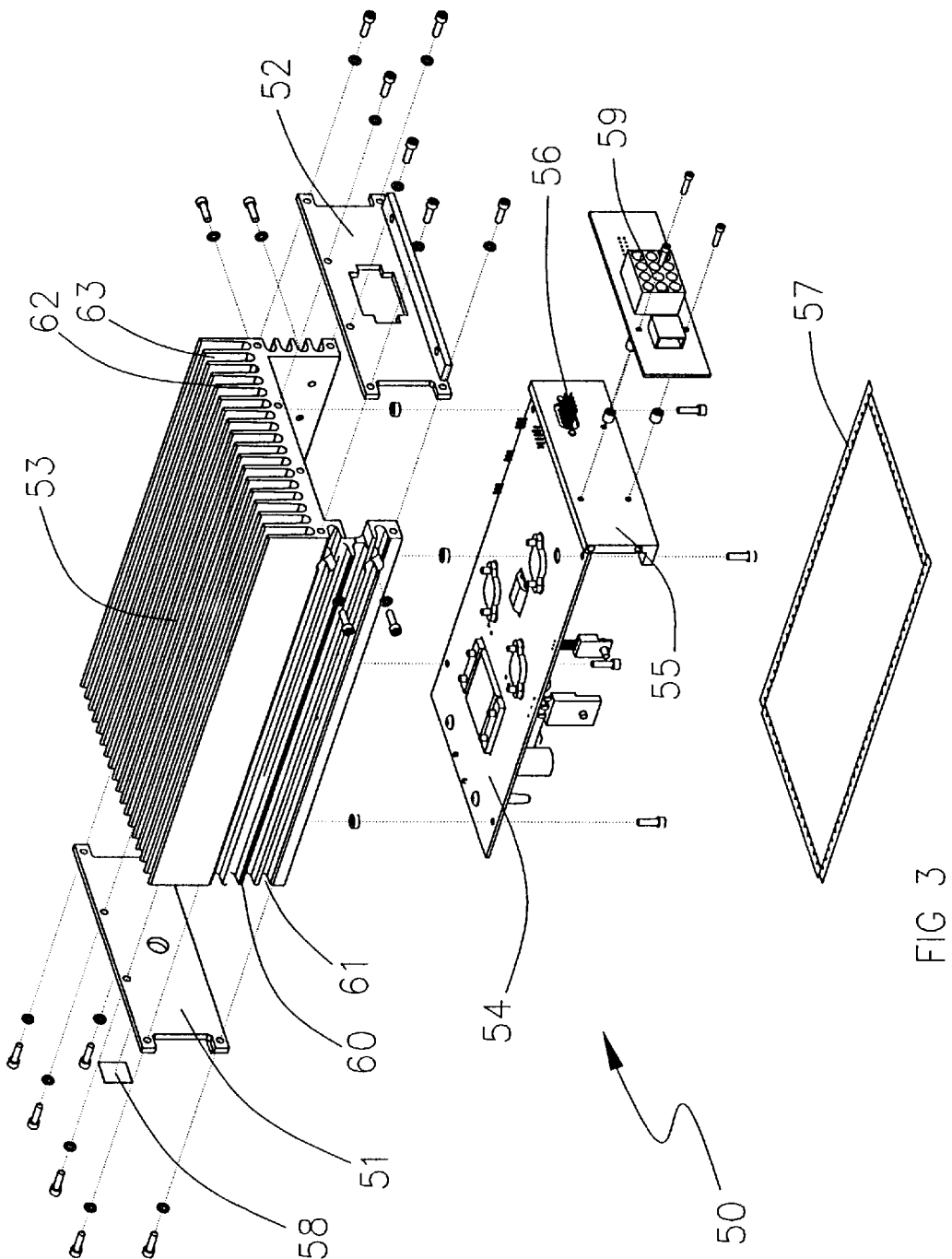
FIG. 3 is an exploded perspective view of the electronics package assembly of the present invention.
Figure 4:
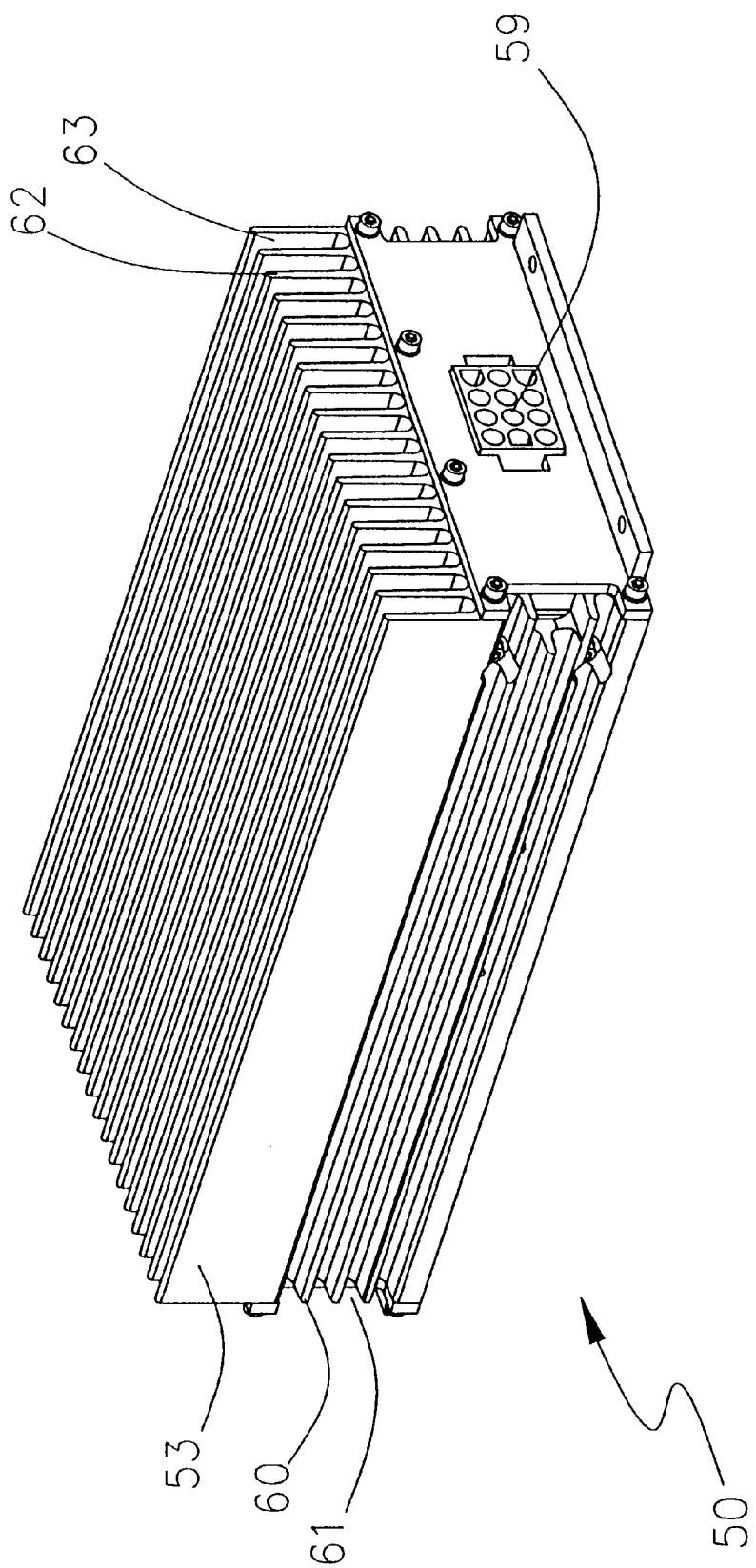
FIG. 4 is perspective view of FIG. 3 in assembled form.

Electronics package assembly 50, as best seen in FIG. 3, includes a U-shaped heatsink channel 53 in which is securely mounted circuit board 54 which supports all of the electronic components associated with providing RF power to the RF feeds 22 coupled thereto through connecting terminals (not numbered) on circuit board 54. The U-shaped heatsink channel 53 has a plurality of horizontal fins 60 extending from its vertical sides and a plurality of vertical fins 62 extending from its horizontal side. The spaces 61 between the horizontal fins and the spaces 63 between the vertical fins communicate at the forward end thereof, with the passageway through which air flow 64 is passing and, at the other end thereof, with the atmosphere. Accordingly, the passageway from common zone 44 above top surface 21a of tube 21 and the spaces 61,63 between the fins of U-shaped heatsink channel 53 form the second cooling air path which cools the electronic package including circuit board 54 and all of the electronic components supported thereon. Cooling air is forced by the fan from the air inlet 43 of the passageway at the front end of the tube across common zone 44 and then through the lengthwise air channels of the second cooling air path and out the air outlet end of the passageway at the rear end of the tube.

d. Balanced Heat Dissipation

As discussed briefly above, the main source of heat of gas laser assembly 10 is from the laser RF energy dissipated in the discharge area of tube 21. Additionally, however, electronics components of the RF assembly 50 also generate significant heat. However, these two heat sources do not generate heat at the same rate and in the same amount. Many factors bear upon the determination of the optimal size of each cooling air path and its heat dissipation capacity. The relevant parameters include the physical dimension of the air paths, the materials from which the tube and cover and heatsinks are made, the power of the laser, the number, size, and power consumed by the electronic components, the throughput rating of the fan, the ambient temperature, the thickness and heat conductivity of the materials, the size of the outlet passages, and many more factors.

Applicants' present design has achieved that physical size and heat dissipating capacity for each path such that the total volume of air flow in the passage is divided between the two paths proportionally to the quantum of heat that must be dissipated in each path to maintain a uniform operating temperature throughout the laser.

The final product is a compact, high power, thermally stable gas laser assembly.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An air cooled laser comprising:

a sealed tube filled with a laser gas constructed and configured for coupling to an external electronics package, an optical resonator aligned with the discharge area for producing directional optical energy in the discharge area and emanating therefrom, an outer housing enclosing the tube and defining a passageway therebetween for the passage of cooling air therethrough, the electronics package supported in a heatsink in the passageway including the power supply for exciting the laser gas, a fan supported in communication with the passageway for providing cooling air thereto, the tube having a finned external shape, and the passageway being divided into two separated cooling air paths, the first cooling air path for cooling the tube, and the second cooling air path for cooling the electronics package.

2. The laser of claim 1 wherein the fan is mounted inside the outer housing in an air inlet end of the passageway atop one end of the tube and the passageway has an air outlet end at the other end of the tube.

3. The laser of claim 1 wherein the tube is an extruded, externally contoured structure.

4. The laser of claim 3 wherein the contoured structure of the tube further comprises:

a rectangular cross-section structure having a uniform length and height and a wide portion having a plurality of spaced-apart fins extending horizontally from the structure along a first portion of the length and a narrow portion having a plurality of spaced-apart fins extending horizontally from the structure adjacent the wide fins along a second portion of the length.

5. The laser of claim 1 wherein the passageway being divided into two separated cooling paths further comprises:

the tube having a wide portion and a narrow portion, a planar surface separating the two paths along the entire length of that portion of the tube having the wide portion.

6. The laser of claim 5 further comprising:

a zone immediately below the fan which is common to both paths.

7. The laser of claim 1 wherein the passageway being divided into two separated cooling paths further comprises:

the passageway being divided by a planar surface, the space below the surface being the first path and the space above the surface being the second path.

8. The laser of claim 1 wherein the first cooling air path is a dual L-shaped path.

9. The laser of claim 8 wherein the dual L-shaped path further comprises:

a pair of vertical air channels one on each side of a reduced width portion of the tube between said portion and adjacent housing portions, and a plurality of horizontal spaces between pairs of adjacent fin portions of the wide portion of the tube and pairs of adjacent fin portions of the narrow portion of the tube forming a plurality of continuous horizontal air channels communicating with the vertical air channels.

10. The laser of claim 1 wherein the first cooling air path further comprises:

the contoured shape of the tube including an extruded, rectangular cross-section structure having a length and a height and a plurality of wide, spaced-apart fins extending horizontally from the structure along a first portion of the length and a plurality of narrow, spaced-apart fins extending horizontally from the structure adjacent the wide fins along a second portion of the length forming a reduced width portion of the tube at one end of the tube and a pair of vertical channels located one on each side of the reduced width portion of the tube between the reduced width portion and adjacent housing portions, the plurality of horizontal spaces between pairs of adjacent wide fins and pairs of adjacent narrow fins forming a plurality of continuous, lengthwise, horizontal channels communicating with the vertical channels, whereby cooling air is forced by the fan from the air inlet end of the passageway at one end of the tube downwardly through the vertical channels and across through the horizontal channels of the first cooling air path and out the air outlet end of the passageway at the other end of the tube.

11. The laser of claim 1 further comprising:

the electronics package supported in the first cooling air path in a U-shaped heatsink having a plurality of fins, the spaces between adjacent pairs of fins forming a plurality of continuous, lengthwise, air channels in the second cooling air path, whereby cooling air is forced by the fan from an air inlet end of the passageway at one end of the tube across through the lengthwise air channels of the second cooling air path and out an air outlet end of the passageway at the other end of the tube.

12. The laser of claim 1 wherein the physical size and heat dissipating capacity of each path is predetermined such that the total volume of air flow in the passageway is divided between the two paths proportionately to the quantum of heat that must be dissipated in each path to maintain a uniform operating temperature throughout the laser.

13. The process of air cooling a laser comprising the steps of:

filling a sealed tube with a laser gas constructed and configured for coupling to an external electronics package, aligning an optical resonator with the discharge area for producing directional optical energy in the discharge area and emanating therefrom, enclosing the tube in an outer housing defining a passageway therebetween for the passage of cooling air therethrough, supporting an electronics package in a heatsink in the passageway including the power supply for exciting the laser gas, supporting a fan in communication with the passageway for providing cooling air thereto, forming the external shape of the tube with fins, and dividing the passageway into two separated cooling air paths, the first cooling air path for cooling the tube, and the second cooling air path for cooling the electronics package.

14. The process of claim 13 further comprising the steps of:

mounting the fan inside the outer housing in an air inlet end of the passageway atop one end of the tube, the passageway having an air outlet end at the other end of the tube.

15. The process of claim 13 further comprising the step of:

extruding the tube into an externally contoured structure.

16. The process of claim 15 wherein the step of contouring the external structure of the tube further comprises the steps of:

producing a rectangular cross-section structure having a uniform length and height and a wide portion having a plurality of spaced-apart fins extending horizontally from the structure along a first portion of the length and a narrow portion having a plurality of spaced-apart fins extending horizontally from the structure adjacent the wide fins along a second portion of the length.

17. The process of claim 13 wherein the step of dividing the passageway into two separated cooling paths further comprises the step of:

forming the tube having a wide portion and a narrow portion, and separating the two paths along the entire length of the tube having the wide portion.

18. The process laser of claim 17 further comprising the step of providing a zone immediately below the fan which is common to both paths.

19. The process of claim 13 wherein the step of dividing the passageway into two separated cooling paths further comprises the step of:

dividing the passageway by a planar surface, the space below the surface being the first path and the space above the surface being the second path.

20. The process of claim 13 wherein the step of dividing the passageway into a separate first cooling air path further comprises the step of dividing the first cooling air path into a dual L-shaped path.

21. The process of claim 20 wherein the step of dividing the first cooling air path into a dual L-shaped path further comprises the steps of forming a pair of vertical air channels one on each side of a reduced width portion of the tube between said portion and adjacent housing portions, and forming a plurality of horizontal spaces between pairs of adjacent fin portions of the wide portion of the tube and pairs of adjacent fin portions of the narrow portion of the tube providing a plurality of continuous horizontal air channels communicating with the vertical air channels, whereby cooling air is forced by the fan from the air inlet end of the passageway at one end of the tube downwardly through the vertical channels and across through the horizontal channels of the first cooling air path and out the air outlet end of the passageway at the other end of the tube.

22. The process of claim 13 further comprising the steps of:

supporting the electronics package in the first cooling air path in a U-shaped, finned heatsink, the spaces between adjacent pairs of fins forming a plurality of continuous, lengthwise, air channels in the second cooling air path, whereby cooling air is forced by the fan from an air inlet end of the passageway at one end of the tube across through the lengthwise air channels of the second cooling air path and out an air outlet end of the passageway at the other end of the tube.

23. The process of claim 13 further comprising the steps of:

forming each path of a predetermined physical size and heat dissipating capacity such that the total volume of air flow in the passageway is divided between the two paths proportionately to the quantum of heat that must be dissipated in each path to maintain a uniform operating temperature throughout the laser.

* * * * *